No. 740,736. PATENTED OCT. 6, 1903.
O. B. BLOCHER.
SAW FILE ATTACHMENT.
APPLICATION FILED JAN. 28, 1903.
NO MODEL.
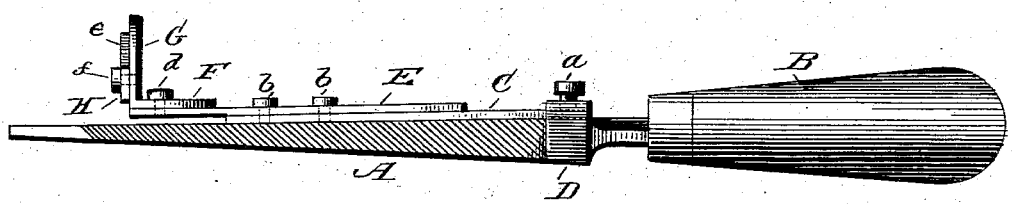
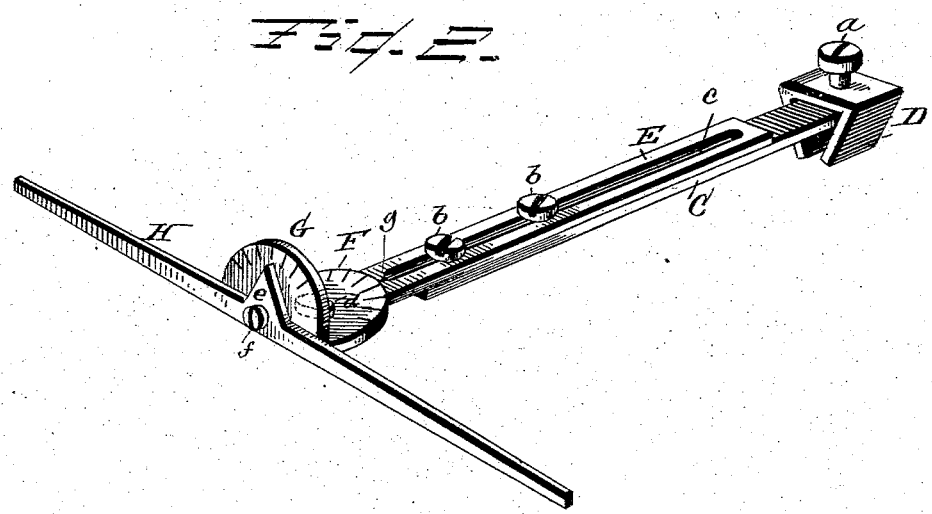

No. 740,736.  Patented October 6, 1903.

UNITED STATES PATENT OFFICE.

OLIVER B. BLOCHER, OF PLANO, ILLINOIS.

SAW-FILE ATTACHMENT.

SPECIFICATION forming part of Letters Patent No. 740,736, dated October 6, 1903.

Application filed January 28, 1903. Serial No. 140,829. (No model.)

*To all whom it may concern:*

Be it known that I, OLIVER B. BLOCHER, a citizen of the United States, residing at Plano, in the county of Kendall and State of Illinois, have invented certain new and useful Improvements in Saw-File Attachments; and I do hereby declare that the following is a full, clear, and exact description of the same, reference being had to the annexed drawings, making a part of this specification, and to the letters of reference marked thereon.

The present invention has relation to that class of devices adapted for attachment to ordinary triangular-shaped files, whereby the file is guided in sharpening the teeth of hand or other similar straight saws at the proper angle upon both sides of the saw.

The object of the invention is to provide such a device that will be simple in construction, readily applied to the file and adjusted at the required angle, and a device that will possess the strength and durability necessary and capable of easy adjustment with relation to the file, so that the operator may ascertain to a certainty when the file starts across the saw that it is at the proper angle and pitch to give the proper stroke clear across the saw at every movement of the file.

The invention consists in a saw-file guide constructed substantially as shown in the drawings and hereinafter described and claimed.

Figure 1 of the drawings is a side elevation of the guide, showing it applied to the ordinary triangular file; Fig. 2, a perspective view of the guide detached from the file.

In the accompanying drawings, A represents the ordinary three-corner or triangular file employed for sharpening the teeth of hand or other similar straight saws, said file having the usual handle B connected to the shank of the file in the ordinary manner. Connected to one side of the file in any suitable manner is a flat support C, the means preferably employed for holding the support to the file comprising the clamp D and set-screw $a$, or any other desirable means may be substituted for this purpose in place of the clamp and set-screw as found most practicable, said clamp in the present instance consisting of a three-sided band, the three sides being at an acute angle to each other to substantially conform to the angular sides of the file, as shown in Fig. 2 of the drawings.

The rear end of the support C extends under the clamp D, and by turning the set-screw in the proper direction the support will be held tightly against the face of the file and prevented from moving lengthwise or sidewise.

Resting upon the support C is a bar E, which is preferably slotted, as shown at $c$, said slot extending lengthwise of the bar, and through the slot extend set-screws $b$, which engage the support C, the set-screws holding the bar in its adjusted position.

The bar E may be of any suitable construction, and any desirable means may be employed for rendering it adjustable and holding it in its adjusted position.

The adjustment of the bar E enables the attachment to the file to adapt itself to the varying lengths of files, so that the guide employed will be at the end of the file.

To the outer end of the slotted bar E is adjustably connected a horizontal index-plate F, through the medium of a suitable set-screw $d$, which forms a pivotal connection between the slotted bar and plate.

The plate F has the usual graduation-marks, and the slotted bar E has a suitable pointer-mark $g$ to act in connection therewith when it is desired to set the index-plate at the desired position to show the operator at what angle he is filing the saw.

If it is desired to file the saw straight across, the index-plate would be set as indicated in Fig. 2 of the drawings, the middle one of the graduation-marks on the plate being on line with the pointer-mark $g$.

If it is necessary to file the saw at a slight angle, the index-plate F is adjusted to bring the next graduation-mark from the middle one of said marks, the greater the angle to which the saw is to be filed the greater the adjustment of the plate from the position shown in Fig. 2 of the drawings, thereby enabling the operator to at all times know exactly at what angle he is filing the saw. The vertical index-plate G is preferably integral with the index-plate F and has adjustably connected to its outer face a suitable guide-arm H, which carries a pointer $e$ and acts in connection with the graduation-marks upon the vertical index-plate, the guide-arm being held in its adjusted position by the set-screw *f*, which forms a pivotal connection of the guide-arm with the vertical index-plate.

The vertical index-plate G is to ascertain the pitch of the teeth of the saw being filed, as in a case where the operator wishes to file the saw with the points straight out from the parallel line of the teeth the pointer *e* would be set as indicated in Fig. 2 of the drawings—that is to say, on line with the middle or center graduation-mark.

If it is desired to file the teeth at a slight pitch forward, the pointer of the guide-arm would be set so as to come opposite the graduation-mark immediately next to the middle or center one, and if filing a rip-saw, where the teeth are at a greater angle, the pointer would be brought to the third one from the middle or center of graduation-mark.

The employment of the double index-plates provides a perfect and ready means for regulating the position of the file to adapt it to the saw being filed.

The guide-arm can be set so that when the file is in operation and running at a certain desired pitch and angle the guide-arm will be parallel over the teeth when the operator begins the stroke with his file and can see at a glance whether the file is being held properly or not.

The slotted bar E is adjusted to adapt the attachment to the length of file used, said bar being extended or moved back upon the support C, as the case may be, so as to bring the guide-arm H in position about one inch back of the point of the file or where the file-surface first touches the saw when the stroke is begun. As the operator is watching the point of the file he can readily keep the guide-arm exactly parallel with the saw-teeth, and consequently is certain to obtain the exact angle and pitch on every tooth of the saw.

In the attachment herein described perfect work may be accomplished without friction of the parts, the file running smoothly and free, as though no device whatever was attached to the file, the parts of the attachment being simple and easily manufactured at a comparatively small cost, so as to bring it within the reach of those requiring such a device.

It is evident that many changes or modifications may be resorted to in the construction of the various operating parts of the attachment without in any manner affecting the essential features of the invention, and any such changes as would come within ordinary mechanical judgment in varying the form and construction of the attachment may be made without departing from the principle of my invention.

Having now fully described my invention, what I claim as new, and desire to secure by Letters Patent, is—

1. An attachment for saw-files, comprising a support and means for connecting it to the file, an adjustable bar resting upon the support and means for holding it in its adjusted position, a double index device consisting of a horizontal plate and a vertical plate, said horizontal plate being adjustably connected to the adjustable bar, and a guide-arm with pointer adjustably connected to the vertical plate, substantially as and for the purpose set forth.

2. An attachment for saw-files, comprising a support and means for connecting it to the file, a slotted bar resting thereon, set-screws extending through the slot of the bar and engaging the support as a means for holding the bar in its adjusted position, a double index-plate adjustably connected to the end of the slotted bar, and a guide-arm adjustably connected to the index device and carrying a suitable pointer, substantially as and for the purpose set forth.

In testimony whereof I affix my signature in presence of two witnesses.

OLIVER B. BLOCHER.

Witnesses:
E. L. HENNING,
G. S. STEWARD.